United States Patent [19]

Finter et al.

[11] Patent Number: 5,077,156

[45] Date of Patent: Dec. 31, 1991

[54] ANTISTATIC AND ELECTRICALLY CONDUCTIVE RELIEF IMAGES, PROCESSES FOR THE PRODUCTION THEREOF, COATING AGENTS AND RADIATION-SENSITIVE POLYMERS

[75] Inventors: Jürgen Finter, Freiburg, Fed. Rep. of Germany; Bruno Hilti, Basel, Switzerland; Carl W. Mayer, Riehen, Switzerland; Ernst Minder, Sissach, Switzerland

[73] Assignee: Ciba-Geigy Corporation, Ardsley, N.Y.

[21] Appl. No.: 411,947

[22] Filed: Sep. 25, 1989

[30] Foreign Application Priority Data

Sep. 30, 1988 [CH] Switzerland ............... 3646/88

[51] Int. Cl.$^5$ ................................................ G03C 3/00
[52] U.S. Cl. ........................................ 430/16; 430/270; 430/900
[58] Field of Search ............................ 430/270, 16, 900

[56] References Cited

U.S. PATENT DOCUMENTS

| | | |
|---|---|---|
| 3,403,165 | 9/1968 | Matsunaga . |
| 3,636,048 | 1/1972 | Klingsberg . |
| 4,106,934 | 8/1978 | Turnblom ............... 430/900 |
| 4,152,152 | 5/1979 | Contois et al. ............... 430/900 |
| 4,384,025 | 5/1983 | Hilti et al. . |
| 4,522,754 | 6/1985 | Hilti et al. . |
| 4,601,853 | 7/1986 | Hilti et al. . |
| 4,604,340 | 8/1986 | Grossa ............... 430/270 |
| 4,617,151 | 10/1986 | Mayer et al. . |
| 4,801,701 | 1/1989 | Hilti et al. . |

OTHER PUBLICATIONS

Pure and Applied Chemistry, 56(3), 355–368 (1984).
Organometallics, 3, 732–735 (1984).

*Primary Examiner*—Jack P. Brammer
*Attorney, Agent, or Firm*—Kevin T. Mansfield; Edward McC. Roberts

[57] ABSTRACT

Substrates which have been coated with a mixture of a radiation-sensitive organic material, an unsubstituted or substituted tetrathio-, tetraseleno- or tetratelluro-naththalene and/or -tetracene and a substance containing active Cl, Br and/or I atoms, form radiation-sensitive layers with electrically conductive charge transfer complexes under the action of thermal energy. Irradiation under an image mask and subsequent development give antistatic or electrically conductive relief images which can be used, for example, as electrodes or conductive connections for electronic components.

8 Claims, No Drawings

ANTISTATIC AND ELECTRICALLY CONDUCTIVE RELIEF IMAGES, PROCESSES FOR THE PRODUCTION THEREOF, COATING AGENTS AND RADIATION-SENSITIVE POLYMERS

The invention relates to a coated material, in which, on at least one surface of a substrate, a relief image of a) a photostructured organic material has been applied which b) contains a charge transfer complex (CT complex) of an unsubstituted or substituted tetrathio-, tetraseleno- or tetratelluro-naphthalene or -tetracene, to a process for the production thereof, to a coating agent and to radiation-sensitive polymers.

In DE-A-3,005,849, electrically conductive moulding compositions consisting of a thermoplastic and a CT complex are described, these CT complexes being fibrous or acicular. Compounds containing N, O and/or S are used as electron donor and polycyano compounds are used as electron acceptor. The moulding compositions can be prepared by adding the acceptor to a polymer solution in which the donor is dissolved, and subsequent evaporation of the solvent. In Pure and Applied Chemistry, volume 56, No. 3, pages 355–368 (1984), M. Kryszewski et al. describe electrically conductive polymer compositions which, as the CT complexes, contain complexes of tetrathiotetracene as electron donor and complexes of tetracyanoquinodimethane, tetracyanoethylene or chloranil as electron acceptor. The electrical conductivity of these systems is low due to the relatively small conductivity of the pure CT complexes.

The stability of the CT complexes with tetracyanoquinodimethane is low. It is known that these CT complexes have to be stabilized against elimination of HCN, cf. DE-A-3,335,513.

In Organometallics 3, pages 732–735 (1984), J. C. Stark et al. describe peri-dichalcogenated polyacenes, certain salts of which have a high electrical conductivity. Such halides are described in U.S. Pat. Nos. 4,384,025 and 4,522,754, German Offenlegungsschriften 3,510,072 and 3,635,124 and EP-A-0,153,905. These halides have in general a melting point above 300° C. Moreover, they are virtually insoluble in organic solvents. Because of these properties, the halides can be incorporated into polymers only in the form of powders. Such polymer compositions have a very low electrical conductivity, since the conductive particles are insulated in the polymer matrix. Relief images containing such CT complexes in the image areas are not known.

A subject of the present invention is a coated material, in which, on at least one surface of a substrate, a relief image of a) a photostructured organic material has been applied which contains b) a charge transfer complex (CT complex) which is formed from chlorine, bromine or iodine and a compound of the formula I or Ia or mixtures thereof,

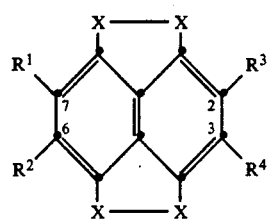
(I)

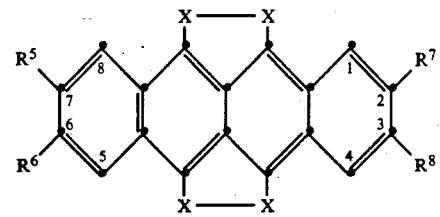
(Ia)

in which X is S, Se or Te, $R^1$, $R^2$, $R^3$ and $R^4$ independently of one another are a hydrogen atom or Cl, or $R^1$ and $R^2$ as well as $R^3$ and $R^4$ together are in each case

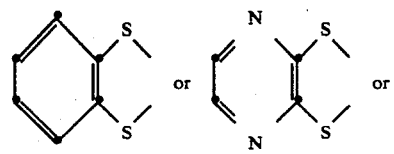

$R^1$, $R^2$, $R^3$ and $R^4$ are each phenylthio, 4-methyl- or 4-methoxy-phenylthio or 4-pyridylthio, $R^5$, $R^6$, $R^7$ and $R^8$ independently of one another are H or F, or $R^5$ is $CH_3$ and $R^6$, $R^7$ and $R^8$ are H, or $R^5$, $R^6$, $R^7$ and $R^8$ are $CH_3$, or $R^5$ and $R^6$ are $CH_3$ or Cl and $R^7$ and $R^8$ are H, or $R^5$ and $R^6$ are H, $R^7$ is $-COR^9$ and $R^8$ is H or $-COR^9$, or $R^5$ and $R^6$ are H and $R^7$ and $R^8$ together are $-CO-O-CO-$ or $-CO-NR^{10}-CO-$, where $R^9$ is halogen, $-OH$, $-NH_2$ or the radical of an alcohol or a primary or secondary amine or is $-OM$, M being a cation, and $R^{10}$ is H or the radical of a primary amine minus the $NH_2$ group.

Component b) is preferably present in a quantity from 0.01 to 10% by weight, in particular 0.05 to 5% by weight and especially 0.5 to 3% by weight, relative to component a).

Some compounds of component b) and their preparation are described in the abovementioned publications. Those CT complexes of component b) are preferred which are formed from compounds of the formula Ia and especially from tetrathiotetracene, tetraselenotetracene and 2-fluoro- or 2,3-difluoro-tetraselenotetracene.

Particularly preferably, the CT complex is formed from Cl and a compound of the formula Ia. Especially, the CT complex of component b) is (tetraselenotetracene)$_2$Cl.

In a preferred embodiment, the CT complex of component b) is in the form of a network of crystal needles.

The novel compounds of the formulae II or IIa

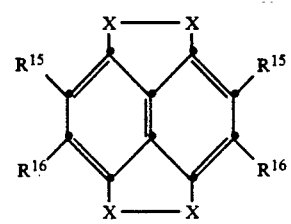
(II)

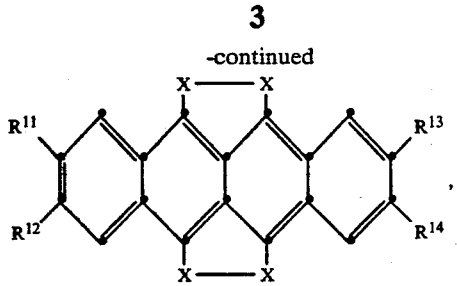
(IIa)

in which $R^{15}$ and $R^{16}$ are each phenylthio, 4-methyl- or 4-methoxy-phenylthio or 4-pyridylthio, or in which $R^{15}$ and $R^{16}$ together are

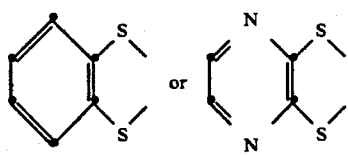

$R^{11}$ is —CH$_3$ and $R^{12}$, $R^{13}$ and $R^{14}$ are H, or $R^{11}$ and $R^{12}$ are Cl or CH$_3$ and $R^{13}$ and $R^{14}$ are H, or $R^{11}$, $R^{12}$, $R^{13}$ and $R^{14}$ are —CH$_3$ or F and X is S, Se or Te, can be prepared, for example, as described below:

a) Tetramethylated Tetracenes

The known starting compounds 4,5-dimethylphthalic anhydride and 2,3-dimethyl-6,7-dihydroxynaphthalene are reacted in the presence of B$_2$O$_3$ to give 2,3,8,9-tetramethyl-5,12-dihydroxy-6,11-dioxo-tetracene (A). This reaction and the further chlorination and reduction to give the product tetrachlorinated in the 5,6,11,12-positions are described in German Offenlegungsschrift 3,635,124. The reaction with Na$_2$X$_2$ leads to the corresponding tetrachalcogenated tetracene. In a variant, the 2,3,8,9-tetramethyl-5,5,6,11,12,12-hexachlorodihydrotetracene (which is obtained in the chlorination with PCl$_5$/POCl$_3$) is converted with one equivalent of Na$_2$Se$_2$ and 2 equivalents of Na$_2$Se directly into the corresponding tetraselenotetracene. The compound A can also be alkylated to the 5,12-dimethoxy derivative with dimethyl sulfate [cf. Chem. Pharm. Bull. 20(4), 827 (1972)]. The reaction of this derivative with P$_4$S$_{10}$ in tetrahydrofuran, subsequent oxidation with Br$_2$ followed by reduction with TiCl$_3$ leads to 2,3,8,9-tetramethyl-5,6,11,12-tetrathiotetracene.

b) 2-Methyltetracenes

2-Methyl-5,12-dioxo-dihydrotetracene is obtained according to the instructions in Chem. Ber. 64, 1713 (1931). Reduction with Zn in alkaline solution leads to 2-methyl-5,12-tetrahydrotetracene which can be dehydrogenated to 2-methyltetracene with chloranil. The reaction with S (see U.S. Pat. No. 3,723,417) gives 2-methyl-5,6,11,12-tetrathiotetracene. 2-Methyl-5,6,11,12-tetrachlorotetracene can also be prepared as described in a) and reacted with Na$_2$X$_2$.

c) Tetrafluorotetracenes

According to the instructions in Chem. Ber. 31, 1159 and 1272 (1898), 2,3,8,9-tetrafluoro-5,12-dihydroxy-6,11-dioxo-tetracene (B) is obtained by condensation of 2,3-difluorophthalic anhydride with succinic acid and subsequent treatment of the condensation product with sodium ethylate in ethanol. The further reaction with PCl$_5$ and subsequently with SnCl$_2$/CH$_3$COOH to give 2,3,8,9-tetrafluoro-5,6,11,12-tetrachlorotetracene is carried out analogously to the instructions in Zhuv. Org. Kim. 15(2), 391 (1979). The reaction with Na$_2$X$_2$ gives the corresponding 2,3,8,9-tetrafluorotetrachalcogenotetracenes. The reduction of compound B with Al in cyclohexanol leads to 2,3,8,9-tetrafluorotetracene which reacts with sulfur [see Bull. Soc. Chim. 15, 27 (1948)] to give 2,3,8,9-tetrafluoro-5,6,11,12-tetrathiotetracene.

d) Naphthalenes

Starting from known 2,3,6,7-tetrachlorotetrachalcogenonaphthalenes (see U.S. Pat. No. 3,769,276), the corresponding 2,3,6,7-substituted tetrachalcogenonaphthalenes can be obtained by reaction with the potassium salts of thiophenol, 4-methylthiophenol, 4-methoxythiophenol, 4-mercaptopyridine, 1,2-benzodithiol and pyrazine-2,3-dithiol.

e) Dimethyl- and dichloro-tetracenes

The procedure is analogous to that described under a), but 4,5-dimethyl- or 4,5-dichloro-phthalic anhydride as starting compounds are reacted with 6,7-dihydroxynaphthalene and the product is chlorinated with PCl$_5$/POCl$_3$.

In the formulae I, Ia, II and IIa, X is preferably S or Se. Halogen $R^9$ is especially chlorine.

In the radical —OM, M can be a metal cation or ammonium cation. The metal cations are especially those of the alkali metals and alkaline earth metals, for example Li$^\oplus$, Na$^\oplus$, K$^\oplus$, Mg$^{2\oplus}$, Ca$^{2\oplus}$, Sr$^{2\oplus}$ and Ba$^{2\oplus}$, Zn$^{2\oplus}$ and Cd$^{2\oplus}$ are also suitable. Example of ammonium cations are NH$_4^\oplus$ and primary, secondary, tertiary or quaternary ammonium ions which can preferably contain C$_1$–C$_{12}$alkyl, cyclohexyl, cyclopentyl, phenyl or benzyl groups. The ammonium cations can also be derived from 5-membered or 6-membered heterocyclic amines, for example piperidine, pyrrole and morpholine.

$R^9$ as the radical of an alcohol is preferably C$_1$–C$_6$alkoxy or C$_2$–C$_6$hydroxyalkoxy, benzyloxy, phenoxy, cyclopentyloxy or cyclohexyloxy.

$R^9$ as the radical of a primary or secondary amine is preferably derived from alkylamines having one or 2 C$_1$–C$_6$alkyl groups.

$R^{10}$ is preferably H, C$_1$–C$_{18}$alkyl, phenyl or benzyl.

Alkyl $R^{10}$ contains preferably 1 to 12 and especially 1 to 6 C atoms.

Examples of alkyl, which can be linear or branched, are: methyl, ethyl, n- or i-propyl, n-, i- or t-butyl, pentyl, hexyl, 2-ethylhexyl, heptyl, octyl, nonyl, decyl, undecyl and dodecyl.

Examples of alkoxy and hydroxyalkoxy are: methoxy, ethoxy, propoxy, butoxy, pentoxy, hexoxy, β-hydroxyethoxy, γ-hydroxypropoxy, δ-hydroxybutoxy and 3-hydroxyhexoxy.

The photostructured organic material can contain up to 95% by weight, realtive to this material, of a binder, for example polymers such as thermoplastic or elastomeric polymers. In particular, it contains up to 80% by weight of binder.

The binders are preferably inert towards the compounds of component b). The binders therefore preferably contain essentially no strongly acidic groups, for example carboxyl groups, or strongly basic groups, for example primary or secondary basic groups, for example primary or secondary amino groups.

In a preferred embodiment, the binders are polymers of monoolefins and diolefins; copolymers of monoolefins and/or diolefins; polystyrene, poly-(p-methylstyrene), poly-(α-methylstyrene); copolymers of styrene or α-methylstyrene; graft copolymers of styrene or α-methylstyrene; halogen-containing polymers; polymers and copolymers of derivatives of α,β-unsaturated acids; polymers derived from acyl derivatives or acetates of unsaturated alcohols; homopolymers and copolymers of cyclic ethers; polyacetals; polyphenylene oxides and sulfides, and mixtures thereof with styrene polymers; polyurethanes; polyureas; polyimides; polybenzimidazoles; polycarbonates; polyesters; polyester-carbonates; polysulfones; polyether-sulfones; polyetherketones; polyvinylcarbazole; polyadducts of epoxide compounds, which may be hydroxyalkylated, with more than one epoxide group in the molecule on average and diols, primary monoamines, disecondary diamines, disecondary linear or cyclic dicarboxylic acid diamides or dicarboxylic acids; cellulose derivatives; sulfur-crosslinked products from polymers containing double bonds; and mixtures of the abovementioned polymers.

Examples of polymers are:

1. Polymers of monoolefins and diolefins, for example polypropylene, polyisobutylene, polybutene-1, polymethylpentene-1, polyisoprene or polybutadiene, as well as polymers of cycloolefins, for example of cyclopentene or norbornene; and also polyethylene, for example high-density polyethylene (HDPE), low-density polyethylene (LDPE) and linear low-density polyethylene (LLDPE).

2. Mixtures of the polymers mentioned under 1), for example mixtures of polypropylene with polyisobutylene, polypropylene with polyethylene (for example PP/HDPE, PP/LDPE) and mixtures of different polyethylene types (for example LDPE/HDPE).

3. Coplymers of monoolefins and diolefins with each other or with other vinyl monomers, for example ethylene/propylene copolymers, propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and terpolymers of ethylene with propylene and a diene such as hexadiene, dicyclopentadiene or ethylidene-norbornene; and also mixtures of such copolymers with each other and with polymers mentioned 1), for example polypropylene/ethylene-propylene copolymers, LDPE-/ethylene-vinyl acetate copolymers, LLDPE/ethylene-/ethylene-acrylate copolymers, LLDPE/ethylene-vinyl acetate copolymers and LLDPE/ethylene-acrylate copolymers.

4. Polystyrene, poly-(p-methylstyrene) and poly-(α-methylstyrene).

5. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/maleic anhydride, styrene/allyl alcohol and styrene/acrylonitrile/methyl acrylate; mixtures of high impact strength from styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene-/ethylene-butylene/styrene, styrene/ethylene-propylene/styrene or styrene/4-vinylpyridine/styrene.

6. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene, styrene and alkyl acrylates or alkyl methacrylates on polybutadiene, styrene and acrylonitrile on ethylene-/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 5), such as are known as so-called ABS, MBS, ASA or AES polymers.

7. Halogen-containing polymers, for example polychloroprene, chlorinated rubbers, chlorinated or sulfochlorinated polyethylene, epichlorohydrin homopolymers and copolymers, especially polymers of halogen-containing vinyl compounds such as polyvinyl chloride, polyvinylidene chloride, polyvinyl fluoride and polyvinylidene fluoride; and copolymers thereof such as vinyl chloride/vinylidene chloride, vinyl chloride/vinyl acetate or vinylidene chloride/vinyl acetate.

8. Polymers derived from derivatives of α,β-unsaturated acids, such as polyacrylates, polymethacrylates and polyacrylonitriles.

9. Copolymers of the monomers mentioned under 8) with each other or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers, acrylonitrile/alkyl methacrylate/butadiene terpolymers or alkyl methacrylate/4-vinylpyridine copolymers.

10. Polymers derived from acyl derivatives or acetals of unsaturated alcohols, such as polyvinyl acetate, polyvinyl stearate, polyvinyl benzoate, polyvinyl maleate, polyvinyl butyral and polyallyl phthalate, and copolymers thereof with the olefins mentioned under item 1.

11. Homopolymers and copolymers of cyclic ethers, such as polyalkylene glycols, polyethylene oxide, polypropylene oxide or polybutylene glycol.

12. Polyacetals, such as polyoxymethylene and those polyoxymethylenes which contain comonomers such as ethylene oxide; polyacetals modified with thermoplastic polyurethanes, acrylates or MBS.

13. Polyphenylene oxides and sulfides, and mixtures thereof with styrene polymers.

14. Polyurethanes derived from polyethers, polyesters and polybutadienes with terminal hydroxyl groups on the one hand and aliphatic or aromatic polyisocyanates on the other hand, and precursors thereof.

15. Polyureas and polybenzimidazoles.

16. Polycarbonates, polyesters, for example polyalkylene terephthalates, and polyester-carbonates.

17. Polysulfones, polyether-sulfones and polyetherketones.

18. Polyvinylcarbazole.

19. Polyadducts of epoxide compounds, which may be hydroxy alkylated and have on average more than one epoxide group in the molecule, and diols, primary monoamines, disecondary diamines, disecondary linear or cyclic dicarboxylic acid diamides or dicarboxylic acids.

20. Cellulose derivatives which have been chemically modified in a polymer-homologous manner, such as cellulose acetates, cellulose propionates and cellulose butyrates, and cellulose ethers such as methylcellulose.

21. Sulfur-crosslinked (vulcanized products) from polymers containing double bonds, for example natural rubber, synthetic rubber and polymers or copolymers of butadiene or isoprene.

22. Mixtures (polyblends) of the abovementioned polymers, for example PP/EPDM, PVC/EVA, PVC/ABS, PVC/MBS, PC/ABS, PC/ASA, PC/PBT, PVC/CPE, PVC/acrylates, POM/thermoplastic PUR, PC/thermoplastic PUR, POM/acrylate, POM/MBS and PPO/HIPS.

Radiation-sensitive and hence photostructurable materials are known. These can be positive systems or negative systems. Such materials have been described, for example, by G. E. Green et al. in J. Macro. Sci.-Revs. Macr. Chem., C21(2), 187–273 (1981–82) and by G. A. Delzenne in Adv. Photochem., 11, pages 1–103 (1979).

Component a) is preferably a photopolymerized or photocrosslinked organic material. Particularly preferably, component a) has been obtained from a non-volatile monomeric, oligomeric or polymeric substance having photopolymerizable or photodimerizable ethylenically unsaturated groups, or from cationically curable systems or photocrosslinkable polyimides. Photosensitive polyimides have been described, for example, in DE-A-1,962,588, EP-A-0,132,221, EP-A-0,134,752, EP-A-0,162,017, EP-A-0,181,837 and EP-A-0,182,745.

In a preferred embodiment, the substrate is transparent and the needle network protrudes partially from the surface of the relief image and is metallized. Such materials are obtainable by irradiating through the transparent substrate under an image mask and, during development (wet development) also removing the partially crosslinked or unpolymerized material at the surface of the relief iamge and metallizing the exposed network of acicular crystals (needle felt) cathodically in an electrolysis bath containing a metal salt. Preferably, the metal is a semirare or rare metal, for example Cu, Ag, Au, Pt, Ir, Co, Ni or Cr.

The invention also relates to a process for preparing material according to the invention, which comprises coating a substrate with a composition of a) a radiation-sensitive organic material which contains Cl, Br and/or I atoms as electron acceptor or has been mixed with a substance containing Cl, Br and/or I atoms as electron acceptor, the Cl, Br and/or I atoms being activated such that they form a CT complex with the compounds of the formula I or Ia under the action of thermal energy, b) a compound of the formula I or Ia or mixtures thereof, c) if appropriate an inert solvent and d) if appropriate a binder, heating the coated substrate, then irradiating it under an image mask and subsequently developing it.

In a preferred embodiment of the process according to the invention, component a) is a homopolymer or copolymer, to the polymer backbone of which a 3,4-dichloromaleimidyl radical and, if desired, other photodimerizable groups are linked via a bridging group.

Examples of suitable bridging groups are linear or branched $C_2$–$C_{12}$alkylene, especially $C_2$–$C_6$alkylene, cyclohexylene, phenylene, benzylene and xylylene. They can be linked to the polymer backbone via —O—, —CO—O—, —CO—OR$^{22}$—O—CO— or —CO—O— groups.

In a preferred embodiment of the process, the polymer backbone is formed by a homopolymer or copolymer of vinyl alcohol or hydroxyalkyl ethers thereof, a homopolymer or copolymer of methacrylic and/or acrylic acid or hydroxyalkyl or hydroxycycloalkyl esters thereof, or a polyadduct of an epoxide compound with on average more than one epoxide group in the molecule and a diol, a primary monoamine, a disecondary diamine, a linear or cyclic disecondary dicarboxylic acid diamide, a dicarboxylic acid or hydroxyalkyl ethers thereof.

It is also preferred that the (additional) photodimerizable group is selected from the group comprising cinnamate and maleimidyl 2,3-substituted by $C_1$–$C_4$alkyl.

In another preferred embodiment, the radiation-sensitive organic material of component a) is mixed with a halogen-containing organic compound which eliminates halogen under the action of heat.

The organic compound, containing halogen, in particular Cl, Br or I, can be a halogenated, saturated or unsaturated, aliphatic, cycloaliphatic, aliphatic-heterocyclic, aromatic or heteroaromatic organic compound which can be substituted by —CN, HO—, =O, $C_1$–$C_4$alkyl, $C_1$–$C_4$alkoxy, —CO—$C_1$–$C_4$alkyl or —COOC$_1$–$C_4$alkyl. The halogen compounds can be used individually or as mixtures. The organic compound is preferably chlorinated, brominated and/or iodinated. The compounds can be mono-halogenated, such as N-brominated or N-chlorinated dicarboxylic acid imides. C-halogenated compounds have advantageously a higher degree of halogenation; preferably, these compounds are C-halogenated to the extent of at least 80%, in particular C-brominated and/or C-chlorinated. Compounds, the halogen atoms of which are activated by electron-attracting groups, are particularly advantageous. Perchlorinated $C_3$–$C_5$alkanes, $C_3$–$C_5$alkenes or compounds with trichloromethyl groups are particularly preferred as the halogen-containing compound.

Examples of halogenated organic compounds are tetrabromomethane, bromoform, trichlorobromomethane, hexachloropropene, hexachlorocyclopropane, hexachloroethane, octachloropropane, n-octachlorobutane, n-decachlorobutane, tetrabromoethane, hexabromoethane, tetrabromo-o-benzoquinone, 2,4-4,6-tetrabromo-2,5-cyclohexadienone, hexabromobenzene, chloranil, hexachloroacetone, 1,4,5,6,7,7-hexachloro-5-norbornene-2,3-dicarboxylic acid, 1,2,5,6,9,10-hexabromocyclododecane, tetrachloroethylene, perchlorocyclopentadiene, perchlorobutadiene, dichloroacetaldehyde diethylacetal, 1,4-dichloro-2-butene, 1,3-dichloro-2-butene, 3,4-dichloro-1-butene, tetrachlorocyclopropene, 1,3-dichloroacetone, 2,3,5,6-hexachloro-p-xylene, 1,4-bis-(trichloromethyl)-benzene, 1,3-dibromopropane, 1,6-dibromohexane, ethyl 3-chloropropionate, 3-chlorotoluene, methyl 2-chloropropionate, 2-chloroacrylonitrile, ethyl trichloroacetate, tris-(trichloromethyl)-triazine, 1-(p-methoxy)-phenylethenyl-5-(1,3-bistrichloromethyl)-triazine, 1,2,3-trichloro- propane, 1,1,2-trichloroethane, butyl chloroformate, trichloroethylene, 2,3-dichloromaleic anhydride, 1,12-dibromododecane, α,α'-dibromo-p-xylene, α,α'-dichloro-o-xylene, phenacyl chloride or bromide, 1,10-dibromodecane, α,α'-dichloro-p-xylene, α,α'-dibromo-m-xylene, iodoacetonitrile, 2,3-dichloro-5,6-dicyanobenzoquinone, methyl 2,3-dichloropropionate, 1-bromo-2-chloroethane, 1-bromo-2-chloropropane, 2-bromoethyl chloroformate, ethyl iodoacetate, N-chloro-, N-bromo- or N-iodo-succinimide or -phthalimide, or mixtures thereof.

In a further preferred embodiment, the radiation-sensitive material is a photopolymerizable or photocrosslinkable organic material and, in particular, the material is a non-volatile monomeric, oligomeric or polymeric substance having photopolymerizable or photodimerizable ethylenically unsaturated groups, or is a cationically curable system or a photocrosslinkable polyimide.

In another preferred embodiment of the process according to the invention, the radiation-sensitive material is mixed with a thermoplastic polymer which is soluble in an inert organic solvent and which contains, bound to a polymer backbone via an —O—, —O—CO—, —CO—OR$^{22}$—OCO— or —CO—O— group, aliphatic or cycloaliphatic side groups which contain at least one Cl, Br or I atom in the α-, β-, γ- or ω-position, R$^{22}$ being $C_2$–$C_{12}$alkylene which is unsubstituted or substituted by OH, Cl, Br or phenyl, $C_4$–$C_{12}$cycloalkylene, $C_4$–$C_{12}$cycloalkylene—$CH_2$—, $C_4$–$C_{12}$cycloalkylene-$(CH_2)_{\overline{2}}$, benzylene or xylylene.

These thermoplastic polymers can have a degree of polymerization from 5 to 10,000, preferably 10 to 5,000 and especially 10 to 1,000.

The aliphatic and cycloaliphatic side groups of component a) are substituted by Cl, Br or I especially the α-, β- or γ-position, in particular in the α- and/or β-position. The aliphatic group contains preferably 1 to 4 C atoms, and is partially or fully substituted by Cl, Br or I. Substitution by Cl is particularly preferred.

The aliphatic side group, which can be linear or cyclic, can be, for example, linear or branched $C_1$–$C_{12}$alkyl, especially $C_1$–$C_6$alkyl and in particular $C_1$–$C_4$alkyl. Examples are methyl, ethyl and the isomers of propyl, butyl, pentyl, hexyl, heptyl, octyl, nonyl, decyl, undecyl and dodecyl. Particular examples of cycloaliphatic groups are cyclopentyl and cyclohexyl. Methyl or ethyl monosubstituted or polysubstituted by Cl, Br or I, especially by Cl, are particularly preferred, for example —$CH_2Cl$, —$CHCl_2$, $CCl_3$, —$CHClCH_3$, —$CCl_2CH_3$, —$CHCl$—$CH_2Cl$, —$CCl_2$—$CH_2Cl$, —$CHCl$—$CHCl_2$, —$CCl_2$—$CHCl_2$, —$CCl_2$—$CCl_3$, —$CH_2$—$CH_2Cl$, —$CH_2$—$CHCl_2$ or —$CH_2$—$CCl_3$.

Preferably, groups of formula —$C_mH_nX_o^2$, in which m is a number from 1 to 12, n is 0 or a number from 1 to 24 and o is a number from 1 to 25, with the sum n+o=2 m+1, $X^2$ is Cl, Br or I and R$^{22}$ is $C_2$–$C_{12}$alkylene which is unsubstituted or substituted by OH, Cl, Br or phenyl, $C_4$–$C_{12}$cycloalkylene, $C_4$–$C_{12}$cycloalkylene—$CH_2$—, $C_2$–$C_{12}$cycloalkylene-$(CH_2)_{\overline{2}}$, benzylene or xylylene, are bound to the groups —O—, —O—CO—, —CO—OR$^{22}$—O—CO— or —CO—O—. $X^2$ is preferably Cl, m is preferably 1 to 6, especially 1 to 4, n is preferably 0 or 1 to 12, especially 1 to 8, and o is preferably 1 to 13, especially 1 to 9, with the sum n+o=2 m+1.

The thermoplastic polymers can be based on different polymers containing hydroxyl groups or carboxyl groups, or mixtures thereof, for example polyesters, polyester-amides, polyurethane, polyimides, polycarbonates and polyimides from monomers containing hydroxyl groups, saponified and, if appropriate, hydroxyalkylated polymers of vinyl esters or vinyl ethers, hydroxylated polydiolefins such as polybutadiene or polyisoprene, polyacrylates or polymethacrylates with hydroxyalkyl radicals in the ester group, polyacrylic or polymethacrylic acids, or reduced polyketones or copolymers thereof; and also copolymers of, if appropriate, hydroxyalkylated vinyl alcohols, allyl alcohols, acrylates or methacrylates or acrylic acids or methacrylic acids or diolefins with comonomers such as acrylonitrile, olefins, diolefins, vinyl chloride, vinylidene chloride, vinyl fluoride, vinylidene fluoride, styrene, α-methylstyrene, maleic anhydride, maleimide, vinyl ethers and vinyl esters; and polyadducts of, if appropriate, hydroxyalkylated epoxide compounds with on average more than one epoxide group in the molecule and diols, primary monoamines, disecondary diamines, disecondary linear or cyclic dicarboxylic acid diamides or dicarboxylic acids.

In a preferred embodiment, the thermoplastic polymer is a linear polyadduct of a glycidyl compound having on average more than one epoxide group and a diol, primary monoamine, disecondary diamine, disecondary linear or cyclic dicarboxylic acid diamide or a dicarboxylic acid, in which the H atom of the secondary OH groups is at least partially substituted by a group —CO—$C_mH_nX_o^2$, wherein m is a number from 1 to 12, n is 0 or a number from 1 to.24 and o is a number from 1 to 25, with the sum n+o=2 m+1, and $X^2$ is Cl, Br or I.

The polyadducts are preferably based on glycidyl compounds having on average two epoxide groups in the molecule.

The glycidyl compounds can especially be those having two glycidyl groups, β-methylglycidyl groups or 2,3-epoxycyclopentyl groups bound to a heteroatom (for example sulfur, preferably oxygen or nitrogen); in particular, these are bis-(2,3-epoxycyclopentyl) ethers, diglycidyl ethers of polyhydric aliphatic alcohols such as 1,4-butanediol or polyalkylene glycols such as polypropylene glycols, diglycidyl ethers of cycloaliphatic polyols such as 2,2-bis-(4-hydroxycyclohexyl)-propane, diglycidyl ethers of polyhydric phenols such as resorcinol, bis-(p-hydroxyphenyl)-methane, 2,2-bis-(p-hydroxyphenyl)-propane (=diomethane), 2,2-bis-(4'-hydroxy-3',5'-dibromophenyl)-propane and 1,3-di-(p-hydroxyphenyl)-ethane, di-(β-methylglycidyl) ethers of the abovementioned dihydric alcohols or dihydric phenols, diglycidyl esters of dicarboxylic acids such as phthalic acid, terephthalic acid, Δ$^4$-tetrahydrophthalic acid and hexahydrophthalic acid, N,N-diglycidyl derivatives of primary amines and amides and heterocyclic nitrogen bases containing two N atoms, and N,N'-diglycidyl derivatives of disecondary diamides and diamines, such as N,N-diglycidylaniline, N,N-diglycidyl-toluidine, N,N-diglycidyl-p-aminophenyl methyl ether and N,N'-dimethyl-N,N'-diglycidyl-bis-(p-aminophenyl)-methane, N',N''-diglycidyl-N-phenyl isocyanurate, N,N'-diglycidylethyleneurea, N,N'-diglycidyl-5,5-dimethyl-hydantoin, N,N'-diglycidyl-5-isopropyl-hydantoin, N,N'-methylene-bis-(N',N'-diglycidyl-5,5-dimethylhydantoin), 1,3-bis-(N-glycidyl-5,5-dimethylhydantoin)-2-hydroxypropane and N,N'-diglycidyl-5,5-dimethyl-6-isopropyl-5,6-dihydrouracil.

The glycidyl compounds can be reacted with aliphatic, cycloaliphatic or aromatic diols to give the preferred polyadducts, a secondary alcohol group which can be modified being formed by addition to the glycidyl group.

The glycidyl compounds can, however, also be reacted with primary aliphatic, cycloaliphatic or aromatic monoamines (for example aniline, toluidine, $C_1$–$C_{12}$alkylamines or $C_2$–$C_{12}$hydroxyalkylamines), aliphatic cycloaliphatic or aromatic dicarboxylic acids (for example maleic acid, adipic acid, trimethyladipic acid, sebacic acid, azelaic acid, succinic acid, dodecylsuccinic acid, phthalic acid, terephthalic acid, $\Delta^4$-tetrahydrophthalic acid, hexahydrophthalic acid, 4-methylhexa-hydrophthalic acid, 3,6-endomethylene-$\Delta^4$-tetrahydrophthalic acid and 4-methyl-3,6-endomethylene-$\Delta^4$-tetrahydrophthalic acid) or aliphatic, cycloaliphatic, heterocyclic or aromatic bis-secondary amines or bis-secondary carboxylic acid amides (for example N,N'-dimethylethylenediamine, N,N'-dimethylpropylene-1,3-diamine, N,N'-dimethylhexa-methylenediamine, N,N'-dicyclohexyl-hexamethylenediamine, N,N',N''-trimethyldiethylenetriamine, N,N'-diethylpropylene-1,3-diamine, N-methyl-3,5,5-trimethyl-3-(methylaminomethyl)-cyclohexylamine, N,N'-dimethylated or -diethylated aromatic diamines, for example m- or p-phenylenediamine, bis-(4-aminophenyl)-methane or -sulfone, 2,2-bis-(4-aminophenyl)-propane, N,N-dimethyl-m-xylylenediamine, as well as ethyleneurea, 5,5-dimethylhydantoin, 5-isopropylhydantoin, N,N-methylene-bis-5,5-dimethylhydantoin, 1,3-bis-(5,5-dimethyl)-2-hydroxypropane and 5,5-dimethyl-6-isopropyl-5,6-dihydrouracil) to give linear polyadducts by polyaddition.

In a preferred process according to the invention, the polyadduct contains a) 100 to 0.1 mol % of identical or different structural units of the formula V

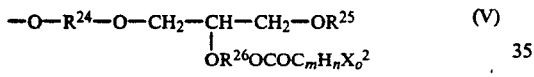

(V)

and b) 99.9 to 0 mol % of identical or different structural units of the formula VI

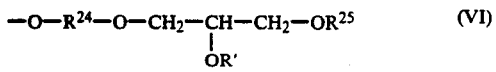

(VI)

relative to the polyadduct, $R^{24}$ and $R^{25}$ independently of one another being the radical of a diol, minus two hydroxyl groups, with aliphatic or aromatic diol groups, and R' being H, unsubstituted or OH-substituted $C_1$–$C_{20}$alkyl, $C_1$–$C_{20}$acyl or aminocarbonyl N-substituted by a $C_1$–$C_{20}$hydrocarbon radical, —$OR^{26}$— being a direct bond or $R^{26}$ being unsubstituted or $C_1$–$C_{16}$alkyl-substituted ethylene, and $X^2$, m, n and o being as defined above.

100 to 20 and especially 30 to 100 mol % of structural units of the formula V and 80 to 0 and especially 70 to 0 mol % of structural units of formula VI are preferably present.

In a preferred embodiment, $R^{24}$ and $R^{25}$ are identical radicals. A radical $R^{24}$ and $R^{25}$ with aliphatic diol groups contains preferably 2 to 12 and especially 2 to 8 C atoms. The hydroxyl groups can be bound to openchain or cyclic aliphatic radicals. Examples of aliphatic radicals are linear or branched $C_2$–$C_{12}$alkylene, $C_3$–$C_8$-cycloalkylene, $C_1$–$C_4$alkyl-$C_5$–$C_8$cycloalkyl, cyclohexylmethylene or cyclohexyldimethylene. Examples are ethylene, 1,2- or 1,3-propylene, 1,2-, 1,3-or 1,4-butylene, 1,2-, 1,3-, 1,4- or 1,5-pentylene, 1,2-, 1,3-, 1,4-, 1,5- or 1,6-hexylene, heptylene, octylene, nonylene, decylene, undecylene, dodecylene, 1,3-cyclopentylene, 1,3- or 1,4-cyclohexylene, 2-methyl-1,4-cyclohexylene and cyclohexyl-1,4-dimethylene.

The aromatic diol groups of the diols used for the polyadducts are especially phenolic groups. The diol radicals having phenolic groups preferably contain 6–30 and especially 6–20 C atoms. A preferred embodiment is a composition in which $R^{24}$ and $R^{25}$ independently of one another are a radical of the formula

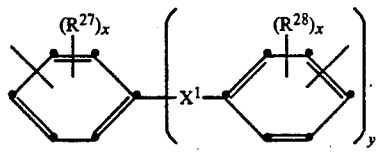

in which $X^1$ is a direct bond, $C_1$–$C_4$alkylene, $C_2$–$C_{12}$alkylidene, $C_5$–$C_8$cycloalkylidene, —O—, —S—, —SO—, —$SO_2$—, —CO—, —$CO_2$—, —N($C_1$–$C_4$alkyl)— or —Si($CH_3$)$_2$—, $R^{27}$ and $R^{28}$ independently of one another are H, halogen, $C_1$–$C_4$alkyl or $C_1$–$C_4$alkoxy, and x is 0, 1 or 2 and y is 0 or 1.

$X^1$ preferably is a direct bond, methylene, ethylene, $C_2$–$C_6$alkylidene, cyclohexylidene or cyclopentylidene, —O— or —S—. $R^{27}$ and $R^{28}$ preferably are H or methyl and y preferably is 1.

In particular, $R^{24}$ and $R^{25}$ are the radical

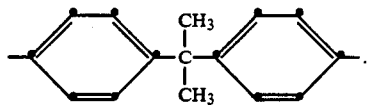

Alkyl-substituted ethylene $R^{26}$ preferably contains $C_1$–$C_4$alkyl and especially $C_1$alkyl or $C_2$alkyl. Ethylene, 1,2-propylene and 1,2- or 2,3-butylene are particularly preferred.

$C_1$–$C_{20}$alkyl R' can be linear or branched. Acyl R' can, for example, be $C_1$–$C_{20}$alkyl—CO—, $C_5$–$C_8$cycloalkyl—CO—, $C_1$–$C_{15}$alkyl—$C_5$–$C_8$cycloalkyl—CO—, $C_5$–$C_8$cycloalkyl—$CH_2$—CO—, $C_1$–$C_{14}$alkyl—$C_5$–$C_8$cycloalkyl—$CH_2$—CO—, phenyl—CO—, benzyl—CO—, $C_1$–$C_{14}$alkyl-phenyl—CO— or -benzyl—CO—. The hydrocarbon radical in aminocarbonyl can, for example, be $C_1$–$C_{20}$alkyl-, $C_5$–$C_8$cycloalkyl—, $C_1$–$C_{15}$alkyl-$C_5$–$C_8$cycloalkyl—, $C_5$–$C_8$cycloalkyl—$CH_2$—, $C_1$–$C_{14}$alkyl-$C_5$–$C_8$cycloalkyl—$CH_2$—, phenyl-, benzyl- or $C_1$–$C_{14}$-alkyl-phenyl- or -benzyl-. Preferably, R' is H.

In another preferred embodiment of the process according to the invention, the thermoplastic polymer is a homopolymer or copolymer of an ester of acrylic or methacrylic acid, which contains chlorinated, brominated and/or iodinated aliphatic or cycloaliphatic groups in the ester group.

In a particularly preferred embodiment, the theremoplastic polymer contains a) 0.1 to 100 mol % of at least one structural element of the formula III

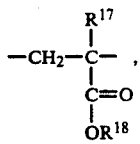

(III)

and b) 0 to 99.9 mol % of at least one structural element of the formula IV

(IV)

relative to the polymer, in which $R^{17}$ is H or methyl, $R^{18}$ is a radical $-(R^{22}-O-CO)_z-C_mH_nX_o^2$, wherein z is 0 or 1, m is a number from 1 to 12, n is 0 or a number from 1 to 24 and o is a number from 1 to 25, with the sum $n+o=2m+1$, $X^2$ is Cl, Br or I and $R^{22}$ is $C_2$-$C_{12}$alkylene which is unsubstituted or substituted by OH, Cl, Br or phenyl, $C_4$-$C_{12}$cyclo-alkylene, $C_4$-$C_{12}$cycloalkylene—$CH_2$—, $C_2$-$C_{12}$cycloalkylene-($CH_2$)$_2$-, benzylene or xylylene, $R^{19}$ is H, $C_1$-$C_6$alkyl or —$COOR^{23}$, $R^{20}$ is H, F, Cl, CN or $C_1$-$C_6$alkyl and $R^{21}$ is H, F, Cl, CN, $R^{23}$—O—, $C_1$-$C_{12}$alkyl, —$COOR^{23}$, —O—CO—$R^{23}$, —$COOR^{22}$—OH,

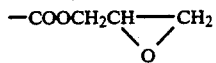

or phenyl, in which $R^{22}$ is as defined above and $R^{23}$ is $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)-phenyl, benzyl or ($C_1$-$C_{12}$alkyl)-benzyl.

Preferably, 100 to 20 and especially 100 to 30 mol % of structural units of the formula III and 80 to 0 and especially 70 to 0 mol % of structural units of the formula IV are present.

$R^{17}$ is preferably methyl. The above preferences apply to $X^2$, m, n and o, and z is preferably 1.

$R^{22}$ is preferably unsubstituted or substituted by OH or Cl. Alkylene $R^{22}$ preferably contains 2 to 6 C atoms. The alkylene can be linear or branched. Examples are ethylene and the isomers of propylene, butylene, pentylene, hexylene, heptylene, octylene, nonylene, decylene, undecylene and dodecylene. Cycloalkylene $R^{22}$ is especially cyclohexylene and, in the radicals containing cycloalkylene, preferably cyclohexylene.

$R^{23}$ can be linear or branched $C_1$-$C_{18}$alkyl, preferably $C_1$-$C_{12}$alkyl and especially $C_1$-$C_6$alkyl. Cycloalkyl $R^{23}$ is especially cyclopentyl or cyclohexyl. In ($C_1$-$C_{12}$alkyl)-cycloalkyl $R^{23}$, the cycloalkyl is especially cyclopentyl or cyclohexyl, and the alkyl group can be linear or branched and preferably contains 1 to 6 and especially 1 to 4 C atoms. In alkylphenyl or alkylbenzyl $R^{23}$, the alkyl group can be linear or branched and preferably contains 1 to 6 and especially 1 to 4 C atoms.

$R^{19}$ is preferably H. Alkyl $R^{19}$ is preferably methyl or ethyl. In —$COOR^{23}$ $R^{19}$, $R^{23}$ is preferably $C_1$-$C_{12}$alkyl and especially $C_1$-$C_6$alkyl.

Alkyl $R^{20}$ is preferably $C_1$-$C_4$alkyl, for example methyl, ethyl, n-propyl and n-butyl. Preferably, $R^{20}$ is H, Cl or $C_1$-$C_4$alkyl.

In the $R^{23}$—O— group $R^{21}$, $R^{23}$ is preferably $C_1$-$C_{12}$alkyl and especially $C_1$-$C_6$alkyl. Alkyl $R^{21}$ contains preferably 1 to 6 and especially 1 to 4 C atoms. In the —$COOR^{23}$ group $R^{21}$, $R^{23}$ is preferably $C_1$-$C_{12}$ and especially $C_1$-$C_6$alkyl, cyclopentyl or cyclohexyl. In the —$OCO$—$R^{23}$ group $R^{21}$, $R^{23}$ is preferably $C_1$-$C_{12}$alkyl and especially $C_1$-$C_6$alkyl, phenyl or benzyl.

The above preferences for $R^{22}$ apply to the —$COOR^{22}$ OH group $R^{21}$.

In a preferred embodiment, $R^{19}$ is H, $R^{20}$ is H, F, Cl, methyl or ethyl, and $R^{21}$ is F, Cl, CN, $C_1$-$C_4$alkyl, $C_1$-$C_6$alkoxy, —$COO$—$C_1$-$C_6$alkyl, —$COO$—$R^{22}$—OH, —$OOC$—$C_1$-$C_6$alkyl or phenyl.

In a preferred process, $R^{17}$ is methyl, $R^{18}$ is a radical —$R^{22}$—O—CO—$C_mH_nX_o^2$, in which m is a number from 1 to 6, n is 0 or a number from 1 to 12 and o is a number from 1 to 13, with the sum $n+o=2m+1$, $X^2$ is Cl and $R^{22}$ is $C_2$-$C_6$alkylene which is unsubstituted or substituted by OH or Cl, cyclopentylene, cyclohexylene, cyclopentylene—$CH_2$—, cyclohexylene—$CH_2$— or cyclohexylene-($CH_2$)$_2$-, $R^{19}$ is H, $R^{20}$ is H, F, Cl or $C_1$-$C_4$alkyl, $R^{21}$ is H, F, Cl, CN, $R^{23}$—O—, $C_1$-$C_6$alkyl, —$COOR^{23}$, —O—CO—$R^{23}$, —$COOR^{22}$—OH,

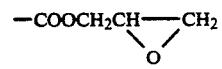

or phenyl, $R^{22}$ is as defined above and $R^{23}$ is $C_1$-$C_6$alkyl, $C_5$cycloalkyl or $C_6$cycloalkyl, phenyl or benzyl.

In another preferred composition, $R^{17}$ is methyl, $R^{18}$ is a radical —$R^{22}$—O—CO—$C_mH_nX_o^2$, in which m is a number from 1 to 4, n is 0 or a number from 1 to 8 and o is a number from 1 to 13, with the sum of $n+o=2m+1$, $X^2$ is Cl, $R^{22}$ is linear $C_2$-$C_6$alkylene or —$CH_2$-CHOHCH$_2$—, $R^{19}$ and $R^{20}$ are H and $R^{21}$ is —$COOR^{22}$-OH or —$COOR^{23}$, in which $R^{22}$ is as defined above and $R^{23}$ is $C_1$-$C_6$alkyl.

Those compositions are particularly preferred in which, in the formula III, $R^{17}$ is H or $CH_3$ and $R^{22}$ is linear or branched $C_2$-$C_6$alkylene, cyclopentylene or cyclohexylene and, in the formula IV, $R^{19}$ is H, $R^{20}$ is H or methyl and $R^{21}$ is —$COOR^{23}$ or —$COOR^{22}$OH, $R^{22}$ and $R^{23}$ being as defined above.

In a further preferred embodiment of the process according to the invention, the thermoplastic polymer is a homopolymer or copolymer of vinyl alcohol, in which the H atom of the secondary OH group is at least partially substituted by a group —Y—$C_mH_nX_o^2$, wherein Y is a direct bond, —CO— or —$R^{26}$—O—CO—, $X^2$ is Cl, Br or I, m is a number from 1 to 12, n is 0 or a number from 1 to 24, o is a number from 1 to 25, with the sum of $n+o=2m+1$, and $R^{26}$ is unsubstituted or $C_1$-$C_{16}$alkyl-substituted ethylene.

Preferably, copolymers are present.

A process is preferred, wherein the copolymer contains a) 90 to 0.1 mol % of structural units of the formula VII

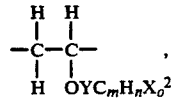

(VII)

and b) 99.9 to 10 mol % of identical or different structural units of the formula VIII

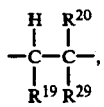 (VIII)

in which Y is a direct bond, —CO— or —$R^2$-$^6$—O—CO—, $X^2$ is Cl, Br or I, m is a number from 1 to 12, n is 0 or a number from 1 to 24, o is a number from 1 to 25, with the sum of n+o=2 m+1, and $R^{26}$ is unsubstituted or $C_1$-$C_{16}$alkyl-substituted ethylene, $R^{19}$ is H, $C_1$-$C_6$alkyl or —COO$R^{23}$, $R^{20}$ is H, F, Cl, CN or $C_1$-$C_6$alkyl, and $R^{29}$ is H, F, Cl, CN, OH, $R^{23}$O—, $C_1$-$C_{12}$alkyl, —COO$R^{23}$, —O—CO—$R^{23}$, —O$R^{22}$OH or phenyl, $R^{23}$ is $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)-phenyl, benzyl or ($C_1$-$C_{12}$alkyl)-benzyl and $R^{22}$ is unsubstituted or $C_1$-$C_{16}$alkyl-substituted ethylene.

Preferably, 70 to 10 and especially 60 to 20 mol % of structural units of the formula VII and 30 to 90 and especially 40 to 80 mol % of structural elements of the formula VIII are present.

The preferences given above apply to the definitions of $R^{19}$ and $R^{20}$ in the formula VIII. The preferences given above likewise apply to the definitions of $R^{22}$ and $R^{23}$.

$R^{29}$ is preferably H, F, Cl, CN, OH, $R^{23}$—O—, $C_1$-$C_4$alkyl, —COO$R^{23}$, —O—CO—$R^{23}$, phenyl, —OCH$_2$C-H$_2$OH or —OCH$_2$CH(CH$_3$)OH, $R^{23}$ being $C_1$-$C_6$alkyl.

Those compositions are particular preferred in which $R^{19}$ and $R^{20}$ are H and $R^{29}$ is —OCO$R^{23}$, in which $R^{23}$ is $C_1$-$C_{18}$alkyl, $C_5$-$C_7$cycloalkyl, ($C_1$-$C_{12}$alkyl)-$C_5$-$C_7$cycloalkyl, phenyl, benzyl, ($C_1$-$C_{12}$alkyl)-phenyl or ($C_1$-$C_{12}$alkyl)-benzyl.

In a preferred embodiment, Y is a direct bond, —CO—, —CH$_2$CH$_2$O—CO— or —CH$_2$CH(CH$_3$)O—CO—, $X^2$ is Cl, m is a number from 1 to 6, n is 0 or a number from 1 to 12 and o is a number from 1 to 13, with the sum of n+o=2 m+1, $R^{19}$ and $R^{20}$ are H, and $R^{29}$ is H, F, Cl, CN, OH, $R^{23}$O—, $C_1$-$C_4$alkyl, —COO$R^{23}$, —O—CO—$R^{23}$, phenyl, —OCH$_2$CH$_2$OH or —OCH$_2$CH(CH$_3$)OH, and $R^{23}$ is $C_1$-$C_6$alkyl, $C_5$cycloalkyl or $C_6$cycloalkyl, phenyl or benzyl.

In a preferred embodiment of the process according to the invention, the radiation-sensitive material containing Cl, Br and/or I atoms is a copolymer which contains photodimerizable groups in the polymer backbone or as side groups and which contains, bound via an —O—, —O—CO—, —CO—O$R^{22}$—OCO— or —CO—O— group to a polymer backbone, aliphatic or cycloaliphatic side groups which contain at least one Cl, Br or I atom in the α-, β-, γ- or ω-position, $R^{22}$ being $C_2$-$C_{12}$alkylene which is unsubstituted or substituted by OH, Cl, Br or phenyl, $C_4$-$C_{12}$cycloalkylene, $C_4$-$C_{12}$cycloalkylene—CH$_2$—, $C_4$-$C_{12}$cycloalkylene-(CH$_2$)$_2$, benzylene or xylylene.

In one of the embodiments, the photodimerizable groups are an imidyl group of the formula IX

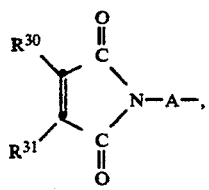 (IX)

in which $R^{30}$ and $R^{31}$ independently of one another are Cl, Br, phenyl or $C_1$-$C_4$alkyl, or $R^{30}$ and $R^{31}$ together are -(CH$_2$)$_3$-, -(CH$_2$)$_4$- or

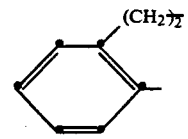

and A is unsubstituted or hydroxyl-substituted, linear or branched $C_2$-$C_{12}$alkylene or cyclohexylene or phenylene, or this is a cinnamoyl group of the formula

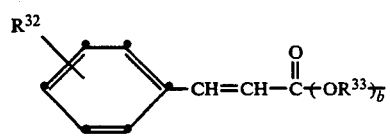 (X)

in which $R^{32}$ is H, $C_1$-$C_{12}$alkoxy, phenoxy or $C_1$-$C_{12}$alkyl—CO—O—, $R^{33}$ is $C_2$-$C_6$alkylene and b is 0 or 1. $R^{30}$ and $R^{31}$ can be linear or branched alkyl, for example methyl, ethyl, n- and i-propyl and n-, i- or t-butyl. Preferably, $R^{30}$ and $R^{31}$ are methyl. A is preferably $C_2$-$C_6$alkylene. Examples of alkylene are ethylene and the isomers of propylene, butylene, pentylene, hexylene, heptylene, octylene, nonylene, decylene, undecylene and dodecylene. $R^{32}$ in the formula X is preferably H, $C_1$-$C_4$alkoxy, phenoxy or $C_1$-$C_6$alkyl—CO—O—.

In another embodiment, the group containing aliphatic Cl, Br or I is of the formula —$C_mH_nX_o^2$, in which m is a number from 1 to 12, n is 0 or a number from 1 to 24 and o is a number from 1 to 25, with the sum of n+o=2 m+1, and $X^2$ is Cl, Br or I.

In a special embodiment, the copolymer contains
a) 0.1 to 90 mol % of at least one structural element of the formula III

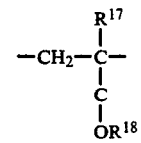 (III)

b) 10 to 99.9 mol % of at least one structural element of the formula XI or XIa

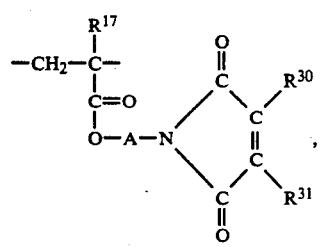 (XI)

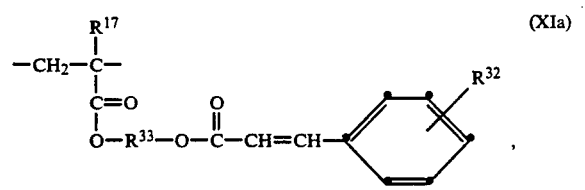 (XIa)

and c) 0 to 89.9 mol % of at least one structural element of the formula IV

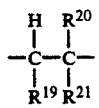 (IV)

relative to the polymer, in which $R^{17}$ is H or methyl, $R^{18}$ is a radical $-(R^{22}-O-C)_z-C_mH_nX_o^2$, in which z is 0 or 1, m is a number from 1 to 12 n is 0 or a number from 1 to 24 and o is a number from 1 to 25, with the sum $n+o=2m+1$, $X^2$ is Cl, Br or I, and $R^{22}$ is $C_2-C_{12}$alkylene which is unsubstituted or substituted by OH, Cl, Br or phenyl, $C_4-C_{12}$cycloalkylene, $C_4-C_{12}$cycloalkylene—$CH_2$—, $C_2-C_{12}$cycloalkylene—$(CH_2)_2$—, benzylene or xylylene, $R^{19}$ is H, $C_1-C_6$alkyl or $-COOR^{23}$, $R^{20}$ is H, F, Cl, CN or $C_1-C_6$alkyl, and $R^{21}$ is H, F, Cl, CN, $R^{23}-O-$, $C_1-C_{12}$alkyl, $-COOR^{23}$, $-O-CO-R^{23}$, $-COOR^{22}-OH$,

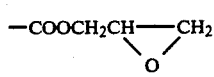

or phenyl, $R^{22}$ is as defined above and $R^{23}$ is $C_1-C_{18}$alkyl, $C_5-C_7$cycloalkyl, $(C_1-C_{12}$alkyl$)-C_5-C_7$cycloalkyl, phenyl, $(C_1-C_{12}$alkyl$)$-phenyl, benzyl or $(C_1-C_{12}$alkyl$)$-benzyl, $R^{30}$ and $R^{31}$ independently of one another are Cl, Br, phenyl or $C_1-C_4$alkyl, or $R^{30}$ and $R^{31}$ together are $-(CH_2)_3-$, $-(CH_2)_4-$ or

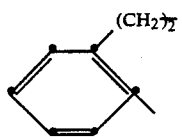

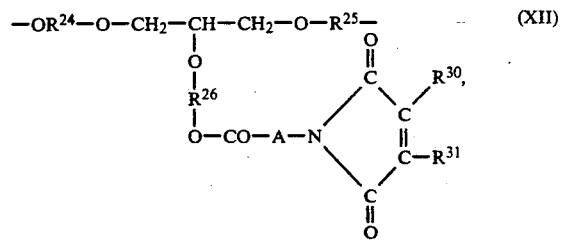 (XII)

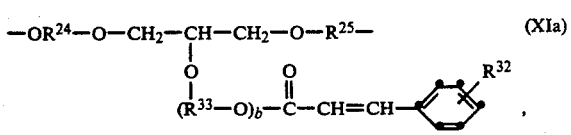 (XIa)

and c) 89.9 to 0 mol % identical or different structural units of the formula VI

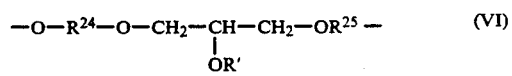 (VI)

relative to the polyadduct, in which $R^{24}$ and $R^{25}$ independently of one another are the radical of a diol, minus two hydroxyl groups, having aliphatic or aromatic diol groups, R' is H, unsubstituted or OH-substituted $C_1-C_{2}$alkyl, $C_1-C_{20}$acyl or aminocarbonyl which is N-substituted by $C_1-C_{20}$hydrocarbon radical, $-OR^{26}$ is a direct bond or $R^{26}$ is unsubstituted or $C_1-C_{16}$alkyl-substituted ethylene, and A, $R^{30}$, $R^{31}$, $R^{32}$, $R^{33}$, $X^2$, m, n, o and b are as defined above.

Those polyadducts are also suitable which contain chalcone groups in the polymer chain, for example those having structural elements of the formulae V and IV, in which $R^{24}$ in the formula V is a radical of the formula

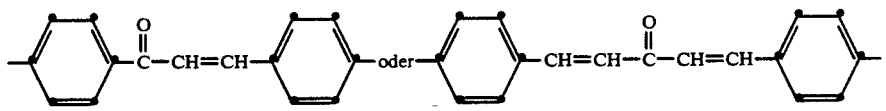

and A is unsubstituted or hydroxyl-substituted, linear or branched $C_2-C_{12}$alkylene, or cyclohexylene or phenylene, $R^{32}$ is H, $C_1-C_{12}$alkoxy, phenoxy or $C_1-C_{12}$alkyl—CO—O— and $R^{33}$ is $C_2-C_6$alkylene.

In another preferred embodiment, the copolymer is a polyadduct which contains a) 0.1 to 90 mol % of identical or different structural units of the formula V

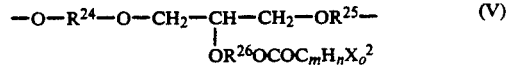 (V)

b) 10 to 99.9 mol % of at least one structural element of the formulae XII or XIIa In a further preferred embodiment, the copolymer contains a) 90 to 0.1 mol % of structural units of the formula VII

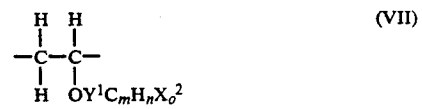 (VII)

b) 10 to 99.9 mol % of at least one structural element of the formulae XIII or XIIIa

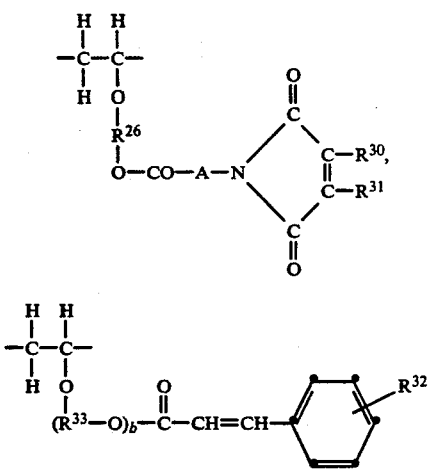 (XIII)

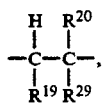 (XIIIa)

and c) 89.9 to 0 mol % of identical or different structural units of the formula VIII $$\begin{array}{c} H \quad R^{20} \\ | \quad | \\ -C-C-, \\ | \quad | \\ R^{19} \, R^{29} \end{array}$$ (VIII)

in which $Y^1$ is —CO— or —$R^{26}$—O—CO—, $X^2$ is Cl, Br or I, m is a number from 1 to 12, n is 0 or a number from 1 to 24, o is a number from 1 to 25, with the sum of $n+o=2\,m+1$, and $R^{26}$ is unsubstituted or $C_1$–$C_{16}$alkyl-substituted ethylene, $R^{19}$ is H, $C_1$–$C_6$alkyl or —$COOR^{23}$, $R^{20}$ is H, F, Cl, CN or $C_1$–$C_6$alkyl, and $R^{29}$ is H, F, Cl, CN, OH, $R^{23}$O—, $C_1$–$C_{12}$alkyl, —$COOR^{23}$, —O—CO—$R^{23}$, —$OR^{22}$OH or phenyl, $R^{23}$ is $C_1$–$C_{18}$alkyl, $C_5$–$C_7$cycloalkyl, ($C_1$–$C_{12}$alkyl)-$C_5$–$C_7$cycloalkyl, phenyl, ($C_1$–$C_{12}$alkyl)-phenyl, benzyl or ($C_1$–$C_{12}$alkyl)-benzyl and $R^{22}$ is unsubstituted or $C_1$–$C_{16}$alkyl-substituted ethylene, and A, $R^{30}$, $R^{31}$, $R^{32}$ and $R^{33}$ are as defined above.

The preferences given above apply to the definitions in these embodiments.

The polymers, described above, having halogen-containing or additionally radiation-sensitive groups are novel.

These thermoplastic polymers can be prepared in a manner known per se in such a way that a polymer containing carboxyl groups or ester-forming derivatives thereof (for example polymethacrylic acid or esters thereof) are esterified with a Cl-, Br- and/or I-substituted alcohol, or a polymer containing hydroxyl groups (for example polyadducts of compounds having 2 epoxide groups or hydroxyalkylated derivatives thereof, hydroxyalkyl polymethacrylates, styrene/allyl alcohol copolymers, polyvinyl alcohols or hydroxy alkylated derivatives thereof) are etherified with a Cl-, Br- or I-substituted alcohol or esterified with a Cl-, Br- or I-substituted carboxylic acid or ester-forming derivatives thereof, for example esters or acid halides. The reaction is advantageously carried out in a solvent and at temperatures from −20° C. to 100° C. The desired polymer can be isolated, for example, by evaporating the volatile constituents, if necessary in vacuo, or precipitating the polymer from the reaction solution with water and drying it. In this case, however, halogenated carboxylic acid radicals can partially be eliminated again by hydrolysis. If alcohols or carboxylic acids (or ester-forming derivatives thereof) having photodimerizable groups are additionally used, corresponding radiation-sensitive copolymers are obtained.

The invention also relates to a radiation-sensitive copolymer which contains activated Cl, Br or I atoms and photodimerizable groups in the polymer backbone or as side groups and which contains, bound via an —O—, —O—CO—, —CO—O$R^{22}$—OCO— or —CO—O— group to a polymer backbone, aliphatic or cycloaliphatic side groups which contain at least one Cl, Br or I atom in the α-, β-, γ- or ω-position, $R^{22}$ being $C_2$–$C_{12}$alkylene which is unsubstituted or substituted by OH, Cl, Br or phenyl, $C_4$–$C_{12}$cycloalkylene, $C_4$–$C_{12}$cycloalkylene—$CH_2$—, $C_4$–$C_{12}$cycloalkylene $-(-CH_2-)_2^-$, benzylene or xylylene.

In a preferred copolymer, the photodimerizable groups are an imidyl group of the formula IX

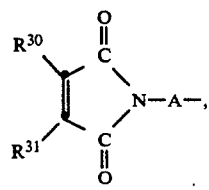 (IX)

in which $R^{30}$ and $R^{31}$ independently of one another are Cl, Br, phenyl or $C_1$–$C_4$alkyl or $R^{30}$ and $R^{31}$ together are

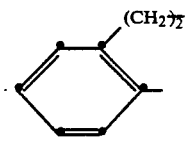

and A is unsubstituted or branched or hydroxyl-substituted linear $C_2$–$C_{12}$alkylene, or cyclohexylene or phenylene, or this is a cinnamoyl group of the formula X

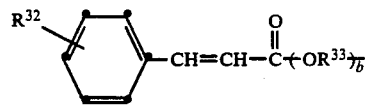 (X)

in which $R^{32}$ is H, $C_1$–$C_{12}$alkoxy, phenoxy or $C_1$–$C_{12}$alkyl—CO—O—, $R^{33}$ is $C_2$–$C_6$alkylene and b is 0 or 1.

A copolymer is likewise preferred in which the aliphatic group containing Cl, Br or I is of the formula —$C_mH_nX_o^2$, in which m is a number from 1 to 12, n is 0 or a number from 1 to 24 and o is a number from 1 to 25, with the sum of $n+o=2\,m+1$, and $X^2$ is Cl, Br or I.

A copolymer is also preferred, which contains a) 0.1 to 90 mol % of at least one structural element of the formula III

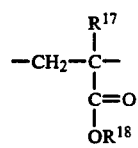 (III)

b) 10 to 99.9 mol % of at least one structural element of the formula XI or XIa

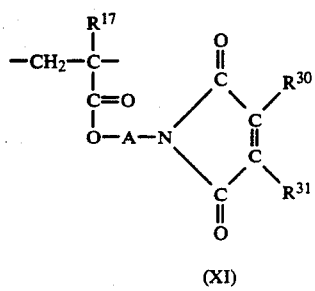

(XI)

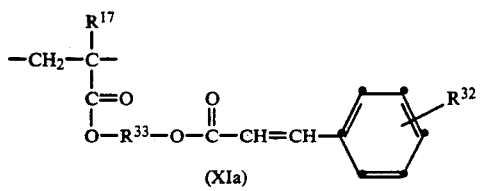

(XIa)

and c) 0 to 89.9 mol % of at least one structural element of the formula IV

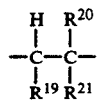

(IV)

relative to the polymer, in which $R^{17}$ is H or methyl, $R^{18}$ is a radical $+R^{22}-O-CO\frac{1}{z}C_mH_nX_o^2$, in which z is 0 or 1, m is a number from 1 to 12, n is 0 or a number from 1 to 24 and o is a number from 1 to 25, with the sum of $n+o=2m+1$, $X^2$ is Cl, Br or I, and $R^{22}$ is $C_2-C_{12}$alkylene which is unsubstituted or substituted by OH, Cl, Br or phenyl, $C_4-C_{12}$cycloalkylene, $C_4-C_{12}$cycloalkylene—$CH_2$—, $C_2-C_{12}$cycloalkylene-$(CH_2)_{\overline{2}}$, benzylene or xylylene, $R^{19}$ is H, $C_1-C_6$alkyl or —$COOR^{23}$, $R^{20}$ is H, F, Cl, CN or $C_1-C_6$alkyl, and $R^{21}$ is H, F, Cl, CN, $R^{23}$—O—, $C_1-C_{12}$alkyl, —$COOR^{23}$, —O—CO—$R^{23}$, —$COOR^{22}$—OH,

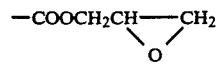

or phenyl, $R^{22}$ is as defined above and $R^{23}$ is $C_1-C_{18}$alkyl, $C_5-C_7$cycloalkyl, ($C_1-C_{12}$alkyl)-$C_5-C_7$cycloalkyl, phenyl, ($C_1-C_{12}$alkyl)-phenyl, benzyl or ($C_1-C_{12}$alkyl)-benzyl, $R^{30}$ and $R^{31}$ independently of one another are Cl, Br, phenyl or $C_1-C_4$alkyl or $R^{30}$ and $R^{31}$ together are $+CH_2)_{\overline{3}}$, $+CH_2)_{\overline{4}}$ or

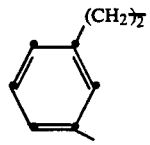

and A is unsubstituted or branched or hydroxyl-substituted linear $C_2-C_{12}$alkylene, or cyclohexylene or phenylene, $R^{32}$ is H, $C_1-C_{12}$alkoxy, phenoxy or $C_1-C_{12}$alkyl—CO—O— and $R^{33}$ is $C_2-C_6$alkylene.

A copolymer is also preferred which is a polyadduct which contains a) 0.1 to 90 mol % of identical or different structural units of the formula V

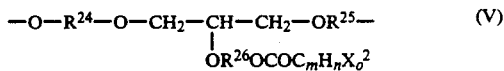

(V)

b) 10 to 99.9 mol % of at least one structural element of the formulae XII or XIIa

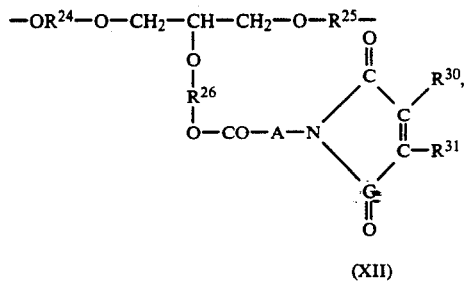

(XII)

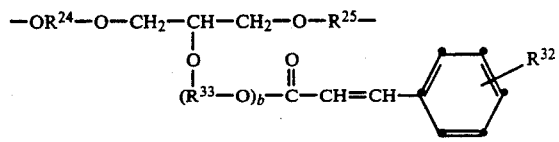

(XIIa)

and c) 89.9 to 0 mol % of identical or different structural units of the formula VI

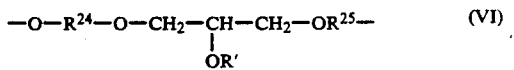

(VI)

relative to the polyadduct, in which $R^{24}$ and $R^{25}$ independently of one another are the radical, minus two hydroxyl groups, of a diol having aliphatic or aromatic diol groups, R' is H, unsubstituted or OH-substituted $C_1-C_{20}$alkyl, $C_1-C_{20}$acyl or aminocarbonyl which is N-substituted by a $C_1$-$C_{20}$hydrocarbon radical, —OR$^{26}$— is a direct bond or R$^{26}$ is unsubstituted or $C_1$-$C_{16}$alkyl-substituted ethylene, and A, R$^{26}$, R$^{30}$, R$^{31}$, R$^{32}$, R$^{33}$, X$^2$, m, n, o and b are as defined above.

A copolymer is also preferred which contains a) 90 to 0.1 mol % of structural units of the formula VII

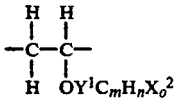

b) 10 to 99.9 mol % of at least one structural element of the formula XIII or XIIIa

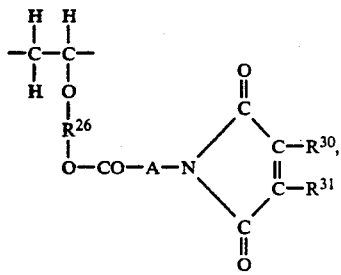

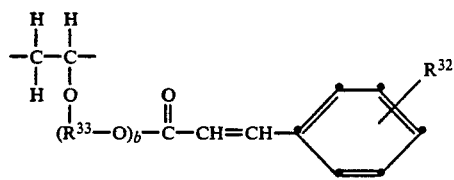

and c) 89.9 to 0 mol % of identical or different structural units of the formula VIII

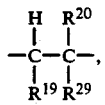

in which Y$^1$ is —CO— or —R$^{26}$—O—CO—, X$^2$ is Cl, Br or I, m is a number from 1 to 12, n is 0 or a number from 1 to 24, o is a number from 1 to 25, with the sum of n+o=2 m+1, and R$^{26}$ is unsubstituted or $C_1$-$C_{16}$alkyl-substituted ethylene, R$^{19}$ is H, $C_1$-$C_6$alkyl or —COOR$^{23}$, R$^{20}$ is H,F, Cl, CN or $C_1$-$C_6$alkyl and R$^{29}$ is H, F, Cl, CN, OH, R$^{23}$O—, $C_1$-$C_{12}$alkyl, —COOR$^{23}$, —O—CO—R$^{23}$, —OR$^{22}$OH or phenyl, R$^{23}$ is $C_1$-$C_{18}$alkyl, $C_5$-$C_7$cycloalkyl, ($C_1$-$C_{12}$alkyl)-$C_5$-$C_7$cycloalkyl, phenyl, ($C_1$-$C_{12}$alkyl)-phenyl, benzyl or ($C_1$-$C_{12}$alkyl)-benzyl and R$^{22}$ is unsubstituted or $C_1$-$C_{16}$alkyl-substituted ethylene, and A, R$^{26}$, R$^{30}$, R$^{31}$, R$^{32}$ and R$^{33}$ are as defined above.

Preferably, the content of component a) in the polymers according to the invention is 0.1 to 50 and especially 0.1 to 20 mol %, and the content of component b) is 99.9 to 50 mol % and especially 99.9 to 80 mol %. Component c) can be present in a quantity from 0.1 to 40 mol %.

The invention also relates to a coating agent, containing a1) radiation-sensitive organic material which contains, as electron acceptors, Cl, Br and/or I atoms which are bound to the radiation-sensitive group and activated in such a way that they form CT complexes with compounds of the formula I or Ia under the action of thermal energy, a2) a radiation-sensitive organic material and a thermoplastic polymer which is soluble in an inert organic solvent and which contains, bound via an —O—, —O—CO—, —CO—OR$^{22}$—OCO— or —CO—O— group to a polymer backbone, aliphatic or cycloaliphatic side groups which contain at least one Cl, Br or I atom in the α-, β-, γ- or ω-position, R$^{22}$ being $C_2$-$C_{12}$alkylene which is unsubstituted or substituted by OH, Cl, Br or phenyl, $C_4$-$C_{12}$cycloalkylene, $C_4$-$C_{12}$cycloalkylene—CH$_2$—, $C_4$-$C_{12}$cycloalkylene—(CH$_2$)$_2$, benzylene or xylylene, a3) a copolymer which contains photodimerizable groups in the polymer backbone or as side groups and, bound via an —O—, —O—CO—, —CO—OR$^{22}$—OCO— or —CO—O— group to a polymer backbone, aliphatic or cycloaliphatic side groups which contain at least one Cl, Br or I atom in the α-, β-, γ- or ω-position, R$^{22}$ being $C_2$-$C_{12}$alkylene which is unsubstituted or substituted by OH, Cl, Br or phenyl, $C_4$-$C_{12}$cycloalkylene, $C_4$-$C_{12}$cycloalkylene—CH$_2$—, $C_4$-$C_{12}$cycloalkylene—(CH$_2$)$_2$, benzylene or xylylene, b) a compound of the formula I or Ia, c) if appropriate, an inert organic solvent and d) if appropriate, a binder.

For the copolymers according to the invention and the coating agent according to the invention, the above preferences apply to the definitions.

The coating agent according to the invention can additionally contain a solvent for a soluble polymer and component b). Examples of suitable solvents are polar, aprotic solvents which can be used alone or in mixtures of at least two solvents. Examples are: ethers such as dibutyl ether, tetrahydrofuran, dioxane, methylene glycol, dimethylethylene glycol, dimethyldiethylene glycol, diethyldiethylene glycol, dimethyltriethylene glycol, halogenated hydrocarbons such as methylene chloride, chloroform, 1,2-dichloroethane, 1,1,1-trichloroethane, 1,1,2,2-tetrachloroethane, carboxylates and lactones such as ether acetate, methyl propionate, ethyl benzoate, 2-methoxyethyl acetate, γ-butyrolactone, δ-valerolactone and pivalolactone, carboxamides and lactams such as N-methylformamide, N,N-dimethylformamide, N,N-diethyl-formamide, N,N-dimethylacetamide, N,N-diethylacetamide, γ-butyrolactam, ε-caprolactam, N-methylpyrrolidone, N-acetylpyrrolidone, N-methyl-caprolactam, tetramethylurea, hexamethylphosphoric triamide, sulfoxides such as dimethyl sulfoxide, sulfones such as dimethyl sulfone, diethyl sulfone, trimethylene sulfone and tetramethylene sulfone, N-methylpyrrolidine, N-methylpiperidine, N-methylmorpholine and substituted benzenes such as benzonitrile, chlorobenzene, o-dichlorobenzene, 1,2,4-trichlorobenzene, nitrobenzene, toluene and xylene.

Additionally, the coating agent according to the invention can contain auxiliaries required for processing and application, for example plasticizers, flow agents, mould-release agents, fillers, flameproofing agents, antioxidants and light stabilizers, stabilizers, dyes, pigments, photoinitiators, photosensitizers and photocatalysts.

The coating agent according to the invention can additionally contain a binder. Examples of binders have been described above. The binder content can, for example, amount to up to 95% by weight, preferably up to 80% by weight, relative to component a1, a2 or a3.

The halogen-containing substance of component a) in the process of coating agent according to the invention is advantageously present at least in such a quantity that it suffices for the formation of CT complexes (donor)/-(halogen)$_a$ from the compounds of component b), where $0.3 > a < 0.9$. $0.3 > a < 0.8$ is preferred, and especially $a = 0.5$ for halogen = Cl and Br, and $a = 0.76$ for halogen = iodine. The quantity to be used essentially depends on the degree of halogenation of the halogen-containing substance or side groups of the polymer and on the content of such side groups in the polymer. The quantity can be selected such that, per mole of compound of the formula I or Ia, 0.5 to 2 and especially 1 to 2 moles of halogen (Cl, Br, I) are present in the halogen-containing substance in the side groups of the polymer of component a). Preferably, an excess is used.

Component b) is preferably present in a quantity from 0.01 to 10% by weight, in particular 0.05 to 5% by weight and especially 0.1 to 3% by weight, relative to component a).

The preparation of this composition according to the invention is carried out by simple mixing of the components, if necessary with the additional use of a solvent.

The substrates used can be diverse solid materials, for example metals and metal alloys, carbides, nitrides, metalloids such as silicon, glass, ceramics, wood, paper and, if appropriate, reinforced polymers. Preferably, glass is used.

The coating can be applied by known processes, for example by means of brushing, coating or blade application. The applied layer is heated, volatile substances being removed and a network of acicular crystals (needle felt) of the CT complexes forming. Heating can mean a temperature from room temperature up to 300° C., preferably 50° to 250° C. and especially 80° to 180° C. This is followed by irradiation under an image mask.

Examples of light sources suitable for irradiation are those having a high proportion of shortwave light. Appropriate technical apparatus and various types of lamps are nowadays available for this purpose. Examples are carbon arc lamps, xenon arc lamps, mercury vapour lamps, metal halogen lamps, fluorescence lamps, argon lamps or photographic floodlights. More recently, laser light sources are also used. These have the advantage that no photomasks are necessary; the controlled laser beam writes directly on the photocurable layer.

Development can be carried out in accordance with the radiation-sensitive material used, for example mechanical development or wet or dry development. If the needle networks of the CT complexes in the bared areas cannot be fully removed by the development, a mechanical aftertreatment can be carried out. If the irradiation is carried out over the whole area, antistatic or electrically conductive coatings are obtained.

The compositions according to the invention, containing a CT complex, are distinguished by high chemical stability and heat resistance and slight migration of the CT complexes. Moreover, surprisingly high conductivities are achieved, which can amount to as much as 25% of the conductivity of the pure CT complexes. The CT complexes form a network of electrically conductive crystal needles (needle felt) in the polymer matrix. As a result of the high stability, there is only a small loss, or none at all, of electrical conductivity in use.

The antistatic or electrically conductive relief structures according to the invention and their metallized embodiments can be used as (transparent) electrodes or conductive connections for, for example, electronic components.

The examples which follow explain the invention in more detail.

A) PREPARATION EXAMPLES

EXAMPLES 1-7

28.4 g of a polyaddition polymer of bisphenol A and bisphenol A diglycidyl ether (molecular weight = 20,000) are dissolved in 200 ml of dimethylformamide (DMF) and 60 ml of pyridine. 2.08 g (0.01 mol) of 2-(2',3'-dichloromaleimidyl)-propionic acid chloride dissolved in 20 ml of DMF are added dropwise at 0° C. with stirring and exclusion of moisture. The mixture is stirred for a further 8 hours at room temperature and then precipitated in water. The isolated polymer is dried at 80° C. in a high vacuum. The content of incorporated 2,3-dichloromaleimidyl groups is determined from the elemental analysis (2,3-dichloromaleimidyl-carboxylic acid chloride is prepared by the general method of Angew. Makromol. Chem. 133 (1985), pages 1547-1570).

The procedure followed in Examples 2 to 7 is analogous. The composition and the glass transition temperature (Tg) are given in Table 1.

TABLE 1
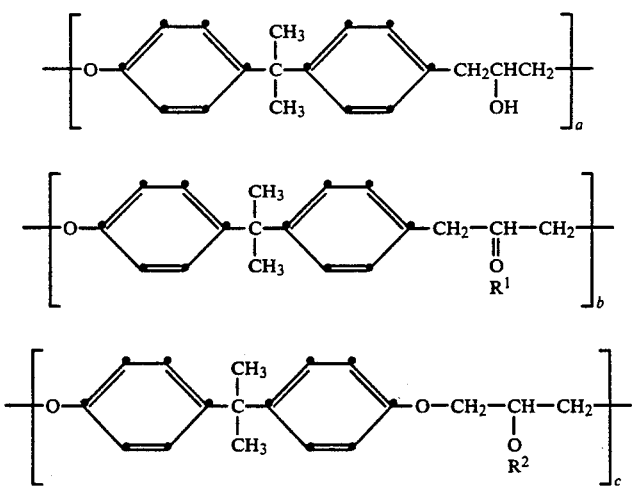
| Example No. | $R^1$ | $R^2$ | $\frac{a}{a+b+c}$ | $\frac{b}{a+b+c}$ | Tg (°C.) |
|---|---|---|---|---|---|
| 1 | ![Cl-substituted maleimide-N-CH2-C(=O)-] | — | 0.1 | 0.9 | 78 |
| 2 | ![Cl-substituted maleimide-N-CH2-C(=O)-] | — | 0.9 | 0.1 | 100 |
| 3 | ![Cl-substituted maleimide-N-C6H4-C(=O)-] | — | 0.9 | 0.1 | 114 |
| 4 | ![Cl-substituted maleimide-N-(CH2)3-C(=O)-] | R+(CH2)2-C(=O)- | 0 | 0.1[1)] | 69 |
| 5[3)] | ![Cl-substituted maleimide-N-(CH2)3-C(=O)-] | R+(CH2)2-C(=O)- | 0 | 0.1[1)] | 76 |

TABLE 1-continued

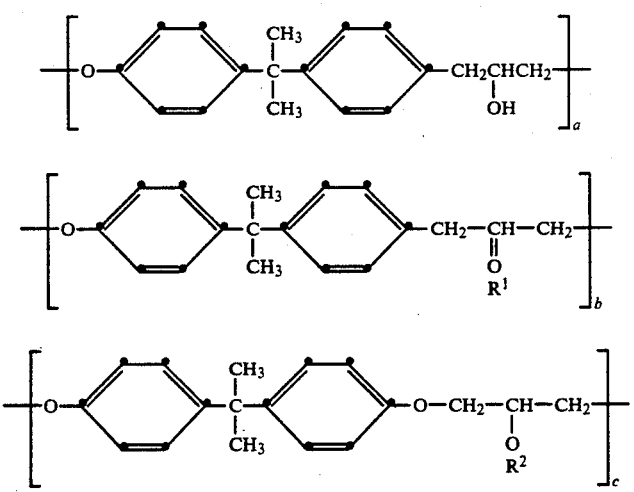

| Example No. | $R^1$ | $R^2$ | $\dfrac{a}{a+b+c}$ | $\dfrac{b}{a+b+c}$ | Tg (°C.) |
|---|---|---|---|---|---|
| 6[4)] | [structure with Cl, N-(CH₂)₃-C(=O)-, dichloromaleimide] | $R-(CH_2)_2-\overset{O}{\underset{\|}{C}}-$ | 0 | 0.9[2)] | 100 |
| 7 | [phenyl-CH=CH-C(=O)-] | $Cl-CH_2-\overset{O}{\underset{\|}{C}}-$ | 0 | 0.9 | 76 |

1) $\dfrac{c}{a+b+c} = 0.9$,
2) $\dfrac{c}{a+b+c} = 0.1$,
3) $\underline{M}_w = 70500$,
4) $\underline{M}_w = 63065$ R = 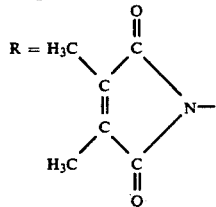

EXAMPLES 8-11

Preparation of
1,2-dichloro-3,8-dioxo-4,7-dioxa-5,9-dimethyl-9-decene 14.42 g (0.1 mol) of 2-hydroxypropyl methacrylate, 10 mg of di-tert-butyl-p-cresol and 23.73 g of pyridine are introduced into 100 ml of THF. 16.14 g (0.1 mol) of 2,3-dichloropropionic acid in 20 ml of THF are added dropwise to this solution at 10° C. After the end of the addition, the solution is stirred for a further 4 hours at 40° C. It is concentrated in a rotary evaporator, the remaining oil is taken up in 50 ml of dichloromethane and repeatedly washed with bicarbonate solution, and the organic phase is dried with sodium sulfate. The product is purified by distillation.

Yield: 19.3 g (71%), boiling point = 104° C./0.6 mbar.

Preparation of
1,1,1-trichloro-2,7-dioxo-3,6-dioxa-8-methyl-8-nonene 13.02 g (0.1 mol) of 2-hydroxyethyl methacrylate and 10 mg of di-tert-butyl-p-cresol are dissolved in 100 ml of THF. A solution of 30.9 g (0.1 mol) of trichloroacetic anhydride in 30 ml of THF is added with ice cooling in such a way that the temperature does not exceed 20° C. After stirring for 2 hours at 50° C., the solution is concentrated in a rotary evaporator, and the residue is taken up in methylene chloride and extracted by shaking with bicarbonate solution. From the dried organic phase, the product is obtained in a purified form by distillation.

Yield: 19.14 g (69.47%), boiling point = 76° C./3 mbar.

Preparation of Photopolymers with Halogen Groups 2.63 g (0.01 mol) of 1,1,1-trichloro-2,7-dioxo-3,6-dioxa-8-methyl-8-nonene and 21.33 g (0.09 mol) of N-(5-methyl-3-oxa-4-oxo-hexen-5-yl)-dimethylmaleimide are stirred in 250 ml of dioxane under nitrogen and with exclusion of light, and heated to 70° C. After the addition of 120 mg of azobisisobutyronitrile, the mixture is stirred for 16 hours, and the polymer formed is then isolated by precipitation in water and drying. An analogous procedure is followed in Examples 9–11. Further data are to be found in Table 2.

cally conductive crystals of (TSeT)$_2$chloride in a polymer matrix remains. The film is irradiated under a photographic mask (Stauffer Resolution Guide) with a 5,000 W mercury high-pressure lamp and then developed with 3-butyrolactone. A relief image of unchanged electrical conductivity (measured by the 4-point method) remains, the data being given in Table 3 which follows.

TABLE 3

| Example No. | Polymer according to Example No. | Conductivity ($\Omega^{-1} \cdot cm^{-1}$) |
|---|---|---|
| 12 | 4 | 0.1 |
| 13 | 5 | 0.5 |
| 14 | 6 | 0.1 |
| 15 | 7 | 0.6 |

TABLE 2

$$\left[ \begin{array}{c} CH_3 \\ | \\ -C-CH_2- \\ | \\ C=O \\ | \\ OR^1 \end{array} \right]_a \left[ \begin{array}{c} CH_3 \\ | \\ -C-CH_2- \\ | \\ C=O \\ | \\ OR^2 \end{array} \right]_b$$

| Example No. | R$^1$ | R$^2$ | $\frac{a}{a+b}$ | $\overline{M}_w{}^{1)}$ | Tg (°C.) |
|---|---|---|---|---|---|
| 8 | dimethylmaleimide-N-(CH$_2$)$_2$- | —CH$_2$CH—OC—CH—CH—CH$_2$Cl with CH$_3$, O, Cl substituents | 0.95 | 32000 | 55 |
| 9 | dimethylmaleimide-N-(CH$_2$)$_2$- | —CH$_2$CH$_2$—OC(=O)—CCl$_3$ | 0.9 | 49700 | 88 |
| 10 | dichloromaleimide-N-(biphenyl)-O-CH$_2$CHCH$_2$— with OH | —CH$_2$CH$_3$ | 0.85 | 17500 | 98 |
| 11 | dichloromaleimide-N-(phenyl)-OCH$_2$CHCH$_2$— with OH | —CH$_2$CH$_3$ | 0.15 | 51000 | not determined |

B) APPLICATION EXAMPLES

EXAMPLES 12–15

1.6 mg of tetraselenotetracene (TSeT) are dissolved in 10 ml of DMF at 120° C., 100 mg of polymer according to Examples 4 to 7 are then added and the solution is poured onto a preheated glass plate. After evaporation of the solvent at temperatures between 90° and 130° C., a transparent film with a needle network of electri-

EXAMPLES 16-22

1.6 mg of tetraselenotetracene together with 100 mg of polyimide (prepared from benzophenonedicarboxyylic anhydride, diaminodurene and 3,3'-dimethyl-5,5'-diethyl-4,4'-diaminodiphenylmethane, intrinsic viscosity 0.6 dl/g in DMF) are dissolved in 10 ml of DMF at 120° C., 3.5 ml of perchloropropene are then added and the solution is poured onto a preheated glass plate. After evaporation of the solvent at temperatures between 90° and 130° C., a transparent film with a needle network of electrically conductive $(TSeT)_2$ chloride crystallites in the polymer matrix remains. The film is irradiated under a photographic mask (Stauffer Resolution Guide) with a 5,000 W mercury high-pressure lamp (30 seconds) and then developed with 3-butyrolactone. A relief image of unchanged electrical conductivity, amounting to 1.8 $\Omega^{-1}cm^{-1}$, remains. Relief images of the examples are produced in an analogous manner according to Table 4.

TABLE 4

| Example No. | Polymer | $\overline{M}_w$[1] | Halogen compound | Exposure time (sec) | Developer | Last exposure step | Conductivity $(\Omega^{-1} \cdot cm^{-1})$ |
|---|---|---|---|---|---|---|---|
| 16 | Polyimide | 45000 | Hexachloropropene | 30 | Dimethylformamide | 6 | 1.8 |
| 17 | Polyimide | 45000 | Polyadduct[2] | 30 | Dimethylformamide | 5 | 0.9 |
| 18 | Poly(vinyl cinnamate) | 80000 | Hexachloropropene | 240 | Ethylglycol acetate | 3 | 0.2 |
| 19 | Poly(vinyl cinnamate) 5% by weight Thioxanthone | 80000 | Hexachloropropene | 30 | Ethylglycol acetate | 5 | 0.1 |
| 20 | Poly(2,3-dimethylimidylethyl methacrylate) | 180000 | Hexachloropropene | 180 | Ethylglycol acetate | 3 | 0.8 |
| 21 | Poly(2,3-dimethylimidylethyl methacrylate) 5% by weight Thioxanthone | 180000 | Hexachloropropene | 20 | Ethylglycol acetate | 7 | 0.2 |
| 22 | Chalcone epoxide resin[3] | 80000 | Hexachloropropene | 90 | Cyclohexanone | 8 | 1 |
|  | Chalcon epoxide resin | 80000 | Hexachloropropene | 120 | Cyclohexanone | 10 | 1 |

[1] Reference: polystyrene standard

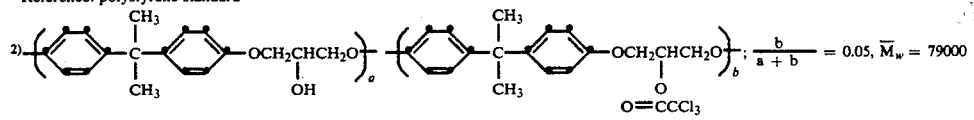

[3] Polyadduct from bisphenol A diglycidyl ether and bis(p-hydroxybenzylidene)acetone

EXAMPLES 23-26

100 mg of polymer are dissolved in 3 ml of DMF at 120° C. To this solution, a hot solution of 1.6 mg of tetraselenotetracene in 7 ml of DMF is added with vigorous stirring and the mixture is poured onto a temperature-controlled glass plate, from which the solvent is allowed to evaporate off. This gives an electrically conductive polymer film.

After exposure of this film through a mask with a 5,000 W mercury high-pressure lamp (30-60 seconds), development is carried out with ethylglycol acetate, giving an electrically conductive pattern. The conductivities are given in Table 5.

TABLE 5

| Example No. | Polymer according to Example No. | Conductivity $(\Omega^{-1} \cdot cm^{-1})$ |
|---|---|---|
| 23 | 8 | 0.1 |
| 24 | 9 | 0.2 |
| 25 | 10 | 1.5 |
| 26 | 11 | 1.8 |

What is claimed is:

1. A substrate which is coated on at least one surface thereof with
   (a) a relief image which comprises
   (a1) a radiation sensitive or photostructurable organic material,
   (a2) up to 95% by weight based on the total weight of component (a1) of a binder, and
   (a3) 0.001-20% by weight based on component (a) of a charge transfer complex (CT complex) which is $(donor)(halogen)_a$ wherein the halogen is chlorine, bromine or iodine, a is greater than 0.3 and less than 0.9 and the donor is a compound of the formula I or Ia or mixtures thereof,

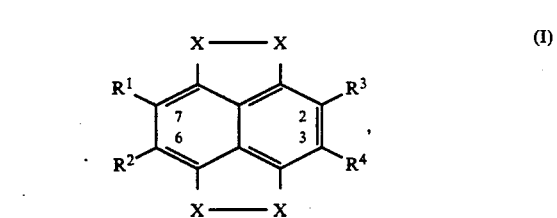

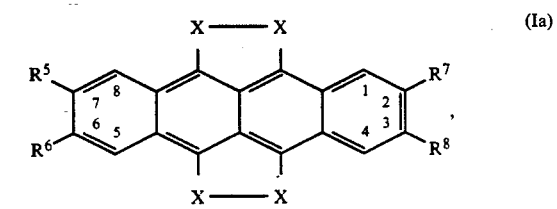

in which X is S, Se or Te, $R^1$, $R^2$, $R^3$ and $R^4$ independently of one another are a hydrogen atom or Cl, or $R^1$ and $R^2$ as well as $R^3$ and $R^4$ together are in each case

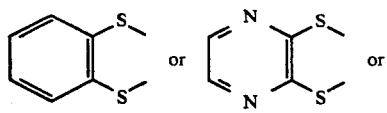

$R^1$, $R^2$, $R^3$ and $R^4$ are each phenylthio, 4-methyl- or 4-methoxyphenylthio or 4-pyridylthio, $R^5$, $R^6$, $R^7$ and $R^8$ independently of one another are H or F, or $R^5$ is $CH_3$ and $R^6$, $R^7$ and $R^8$ are H or $R^5$, $R^6$, $R^7$ and $R^8$ are $CH_3$ or $R^5$ and $R^6$ are $CH_3$ or Cl and $R^7$ and $R^8$ are H, or $R^5$ and $R^6$ are H, $R^7$ is —$COR^9$, and $R^8$ is H or —$COR^9$, or $R^5$ and $R^6$ are H and $R^7$ and $R^8$ together are —CO—O—CO— or —CO—NR$^{10}$—CO—, where $R^9$ is halogen, —OH, —$NH_2$, or $C_1$-$C_6$alkyl or is —OM, M being a cation, and $R^{10}$ is H or $C_1$-$C_{18}$alkyl, phenyl or benzyl, wherein the CT complex is in the form of a network of crystal needles.

2. A substrate according to claim 1, wherein the CT complex is formed from a compound of the formula Ia and the compound is tetrathiotetracene, tetraselenotetracene or 2-fluoro- or 2,3-difluoro-tetraselenotetracene.

3. A substrate according to claim 1, wherein the CT complex is formed from chlorine and a compound of the formula Ia.

4. A substrate according to claim 1, wherein the CT complex is (tetraselenotetracene)$_2$Cl.

5. A substrate according to claim 1, wherein component a) is a photopolymerizable or photocrosslinked organic material.

6. A substrate according to claim 5, wherein component a) has been obtained from a non-volatile monomeric, oligomeric or polymeric substance having photopolymerizable or photodimerizable, ethylenically unsaturated groups, from cationically curable systems or from photocrosslinkable polyimides.

7. A substrate according to claim 1, wherein the substrate is transparent and the needle network partially protrudes from the surface of the relief image and is metallized.

8. A substrate according to claim 7, wherein the metal is a semirare or rare metal.

* * * * *